(12) United States Patent
Sutto

(10) Patent No.: US 9,637,832 B2
(45) Date of Patent: May 2, 2017

(54) PURIFICATION OF COAL AND FLY ASH BY IONIC LIQUIDS

(71) Applicant: The United States of America, as represented by the Secretary of the Navy, Washington, DC (US)

(72) Inventor: Thomas E. Sutto, Woodbridge, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/013,016

(22) Filed: Feb. 2, 2016

(65) Prior Publication Data

US 2016/0222532 A1     Aug. 4, 2016

Related U.S. Application Data

(60) Provisional application No. 62/110,654, filed on Feb. 2, 2015.

(51) Int. Cl.

| | |
|---|---|
| *C25C 1/22* | (2006.01) |
| *C22B 59/00* | (2006.01) |
| *C22B 60/02* | (2006.01) |
| *C22B 7/02* | (2006.01) |
| *C21B 15/00* | (2006.01) |
| *C25C 7/02* | (2006.01) |
| *C25C 7/08* | (2006.01) |
| *C25C 1/20* | (2006.01) |
| *C22B 1/00* | (2006.01) |
| *C22B 60/00* | (2006.01) |

(52) U.S. Cl.
CPC ............ *C25C 1/22* (2013.01); *C21B 15/00* (2013.01); *C22B 1/005* (2013.01); *C22B 7/02* (2013.01); *C22B 59/00* (2013.01); *C22B 60/00* (2013.01); *C22B 60/0291* (2013.01); *C25C 1/20* (2013.01); *C25C 7/02* (2013.01); *C25C 7/08* (2013.01); *Y02P 10/138* (2015.11); *Y02P 10/212* (2015.11)

(58) Field of Classification Search
CPC .... C25C 1/22; C25C 7/02; C25C 7/08; C25C 1/20; C22B 60/00; C22B 1/005; C22B 7/02; C22B 59/00; C22B 60/0291; C21B 15/00; Y02P 10/138; Y02P 10/212
See application file for complete search history.

(56) References Cited

U.S. PATENT DOCUMENTS 2,993,752 A * 7/1961 Lewis ............... C01F 15/00
423/10

* cited by examiner

*Primary Examiner* — Arun S Phasge
(74) *Attorney, Agent, or Firm* — US Naval Research Laboratory; Rebecca L. Forman

(57) ABSTRACT

A method for recovering heavy metals and rare earth elements from fly ash, coal ash, and unrefined mineral ores containing rare earth metals using an ionic liquid and an organic acid to solubilize the metals. The solubilized components are removed from the ionic liquid by electrochemical deposition. The heavy metals and rare earth elements are deposited onto an electrode, and then purified via electrochemical processing.

9 Claims, 5 Drawing Sheets

PURIFICATION OF COAL AND FLY ASH BY IONIC LIQUIDS

PRIORITY CLAIM

The present application is a non-provisional application claiming the benefit of U.S. Provisional Application No. 62/110,654, filed on Feb. 2, 2015 by Thomas E. Sutto, entitled "Purification of Coal and Fly Ash by Ionic Liquids," the entire contents of which is incorporated herein by reference.

BACKGROUND OF THE INVENTION

Field of the Invention

The present invention relates to the recovery of heavy metals and rare earth elements from fly ash and coal ash.

Description of the Prior Art

In a single year, over 70 million metric tons of ash is created by coal burning plants. Much of this ash is contaminated with heavy metals, such as lead and arsenic, as well as heavier elements such as the rare earths. It has been calculated that the average rare earth element (REE) of this ash is near 0.1 to 0.05%. If these REE's could be recovered from the coal ash, that would come to nearly 300,000 tons of REE's per year, or three times the amount currently produced by China, the main source of REE's for the world.

Currently, 30-40 million tons of fly ash are stored each year, sometimes in large slurry-filed dams that can rupture and cause wide-spread contamination and devastation. Although some coal ash or fly ash is used in other industries, such as the cement industry, much of the coal ash cannot be used due to the heavy metal contamination, including thorium, which also makes the ash too radioactive to be used in other industries. As such, much of the ash must be stored indefinitely.

The Tennessee Valley Authority Kingston Fossil Plant coal fly ash slurry spill released 1.1 billion US gallons or 5.4 million cubic yards of coal fly ash slurry. River testing of the contaminated area showed significantly elevated levels of toxic metals (including arsenic, copper, barium, cadmium, chromium, lead, mercury, nickel, and thallium).

Unfortunately, there are a limited number of methods that can be used for processing either mineral ores or fly and coal ash, without incurring significant financial burden to industry. As such, the number of coal ash/slurry storage areas is growing across the country. The present invention is the first to use an ionic liquid based approach to remove the heavy metal contamination, not only from fly and coal ash, but also for the removal of rare earth elements from unrefined ores.

In general, previous methods for treating fly ash or mineral ores used different types of acidification in water/slurry mixtures, followed by post processing to remove the heavy metals. This process is known to generate significant amounts of contaminated water, which limits the applicability of these techniques. Additionally, there is significant cost associated with these technologies owing to the need for handling and processing contaminated waste water.

For fly or coal ash, the other most common technique involves the use of either plasma heating the ash to temperatures in excess of 3000° C., which reduces the heavy metals to their metallic state. Once in their metallic state, they can then be recovered from slurry mixtures since they settle out. However, the use of fossil fuels to create the heat required, make this technique too expensive to be applicable for large scale processing. The second technique involves the use of $MgCl_2$ or $CaCl_2$, which is fused with the fly ash at 1000 to 1400° C. Again, this requires large amounts of the chloride salt, which is not regenerated in the process, as well as the energy required to heat the fly ash to high temperatures.

BRIEF SUMMARY OF THE INVENTION

The aforementioned problems are overcome in the present invention which provides a new method for recovery of heavy metals and rare earth elements from fly ash, coal ash, and unrefined mineral ores containing rare earth metals. This ash could be a prime source of rare earth elements. Also, this process will remove the heavy metal and radioactive contamination of the ash, rendering it safe for other industrial applications. This process is based on a recyclable ionic liquid process using an organic acid, such as acetic acid, to solubilize the metals. These solubilized components can then be removed from the ionic liquid by electrochemical deposition. The ionic liquid can then be recycled and reused in this process without generating ionic liquid waste. The heavy metals and rare earth elements can be deposited onto a copper electrode (charged cathodically). After this, they can be further purified via electrochemical processing. The only other byproduct of this is regeneration of the organic acid, which can be added back to the ionic liquid to begin the process again.

The process of the present invention features the use of an ionic liquid for refining ores, as well as refining ash. Previous methods used high reaction temperatures, water/acid mixtures, and even toxic organic bromides as solvents. This process is revolutionary in that it is envisioned as a zero-waste generating process, where no acid contaminated water would be generated, which is a critical environmental hazard for previous processing techniques. The solid components remaining from either the mineral ore or the ash become free of hazardous heave metal components, allowing it to be used for a myriad of other purposes, such as raw material for cement, plaster, or agricultural uses.

An advantage of this process is that it does not generate excess acid contaminated water waste. The ionic liquid component can be reprocessed and reused repeatedly, thus mitigating the initial cost of the ionic liquid. Previous methods produced acid contaminated sludge after processing. In this process, the acid is removed from the ionic liquid, in the water mixing process, and the de-acidified solid material is not acidic. Another advantage of this process is that it is a closed-loop system. The process produces essentially no contaminated by-products that need to be treated prior to disposal.

These and other features and advantages of the invention, as well as the invention itself, will become better understood by reference to the following detailed description, appended claims, and accompanying drawings.

BRIEF DESCRIPTION OF THE DRAWINGS

FIG. 1A shows a substituted imidazolium, where R is an alkyl group or a hydrogen or a halide. In FIG. 1B, X is N or P, and R is an alkyl group, hydrogen or a halide.

DETAILED DESCRIPTION OF THE INVENTION

The present invention provides a multi-step process of using an ionic liquid to purify and remove heavy metals and rare earth elements from mineral ores, fly ash and coal (bottom) ash. The types of ionic liquids are shown in FIGS. 1A-1E. Although only three anions are shown, a host of other anions that create hydrophobic ionic liquids are viable, including, but not limited to, tetrafluoroborate, proprionate, and butanate. Also not shown in FIGS. 1A-1E but also possible, is a pyridinium cation; however, these are susceptible to attack by an acid gas, as are the ammonium and phosphonium cations.

Figure 1A:
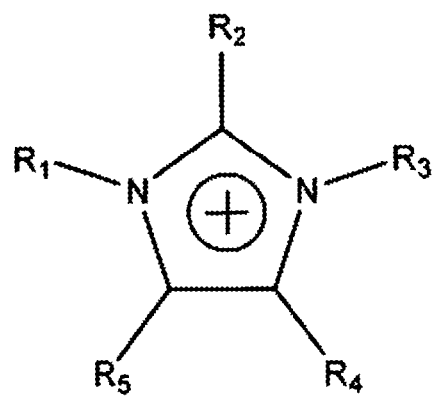
FIGS. 1A-1E show embodiments of the structure of the ionic liquid.
Figure 1B:
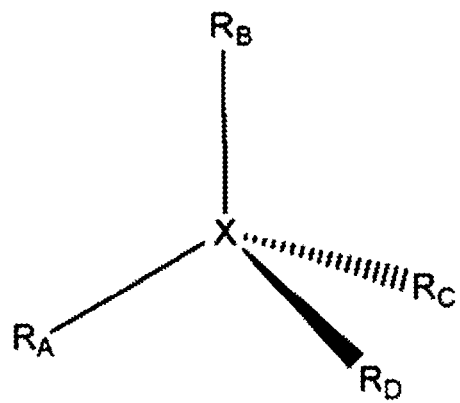
Figure 1C:
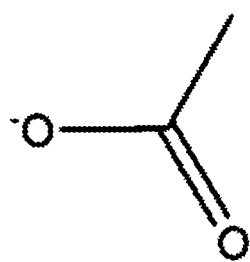
Figure 1D:
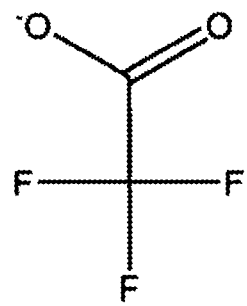
Figure 1E:
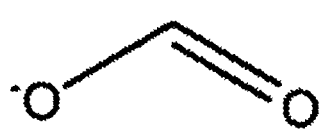
Figure 2:
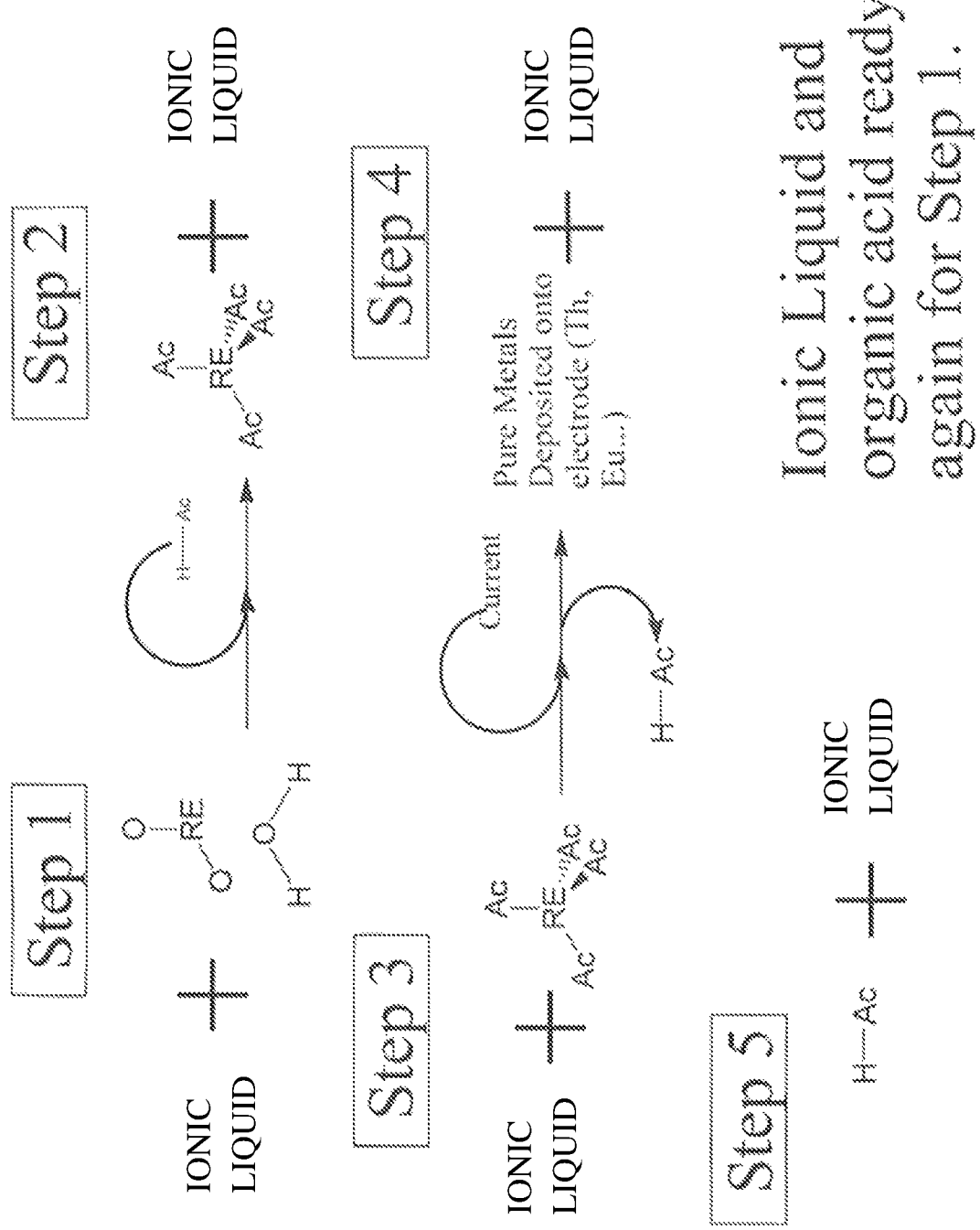
FIG. 2 is a schematic of the process of the present invention.

FIG. 2 is a schematic of the process of the present invention. In step 1, the ash (usually stored as a wet slurry in large fields), is placed in a container with the ionic liquid.

In step 2, the ore or fly ash in the ionic liquid is agitated by a mechanical stirring process, and an organic acid is added to the ionic liquid.

In step 3, the ionic liquid with the solubilized rare earth elements and heavy metals are electrochemically purified by using electrodeposition to deposit the metals onto an electrode. Both electrodes could be made of copper or some other conductive material. The main by-product of this reaction is the organic acid, which could be re-used in step 2 of this process.

In step 4, the purified ionic liquid is strained to remove the leftover solid material (mostly silica), while the electrode coated with the heavy metals is removed and then electrochemically treated to remove the metal components deposited out of the ash.

In step 5, the ionic liquid is heated to 100° C. to remove much of the water, then the ionic liquid is ready to re-start the process at step 1.

The following example was performed to determine if removal of the radioactive and heavy metal contaminants could be removed by this process. For the ionic liquid, 10 grams of 1-methyl-3-ethyl-midazolium trifluoroacetate was used, and 10% acetic acid was added. 5 grams of coal ash was added to the ionic liquid/acetic acid solution. The slurry of coal ash in the ionic liquid/acid solution was stirred and heated for 1 hour at 80° C. The solid material was filtered from the ionic liquid/acid solution and washed with water resulting in remaining silicate ash and magnetic iron compounds. A gold foil electrode was used, and the metals electrodeposited out of the ionic liquid coal ash wash onto the electrode.

Tests showed that prior to the ionic liquid treatment, the coal ash exhibited radioactivity in the amount of 70 mS/hour. Post treatment measurement showed only 5 mS/h, or over a 90% reduction in the radioactivity.

Figure 3:
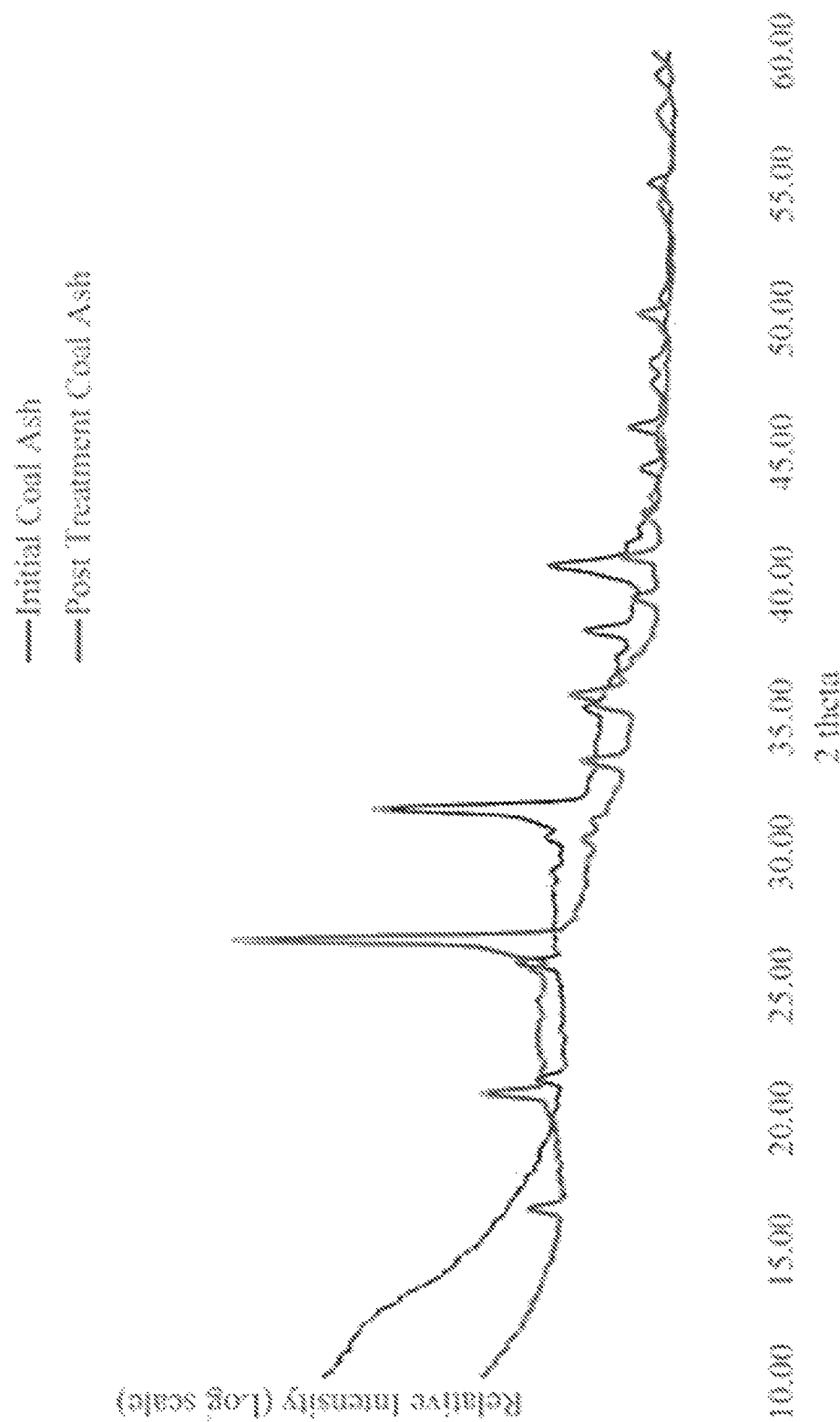
FIG. 3 shows the XRD pattern of the coal ash.
Figure 4:
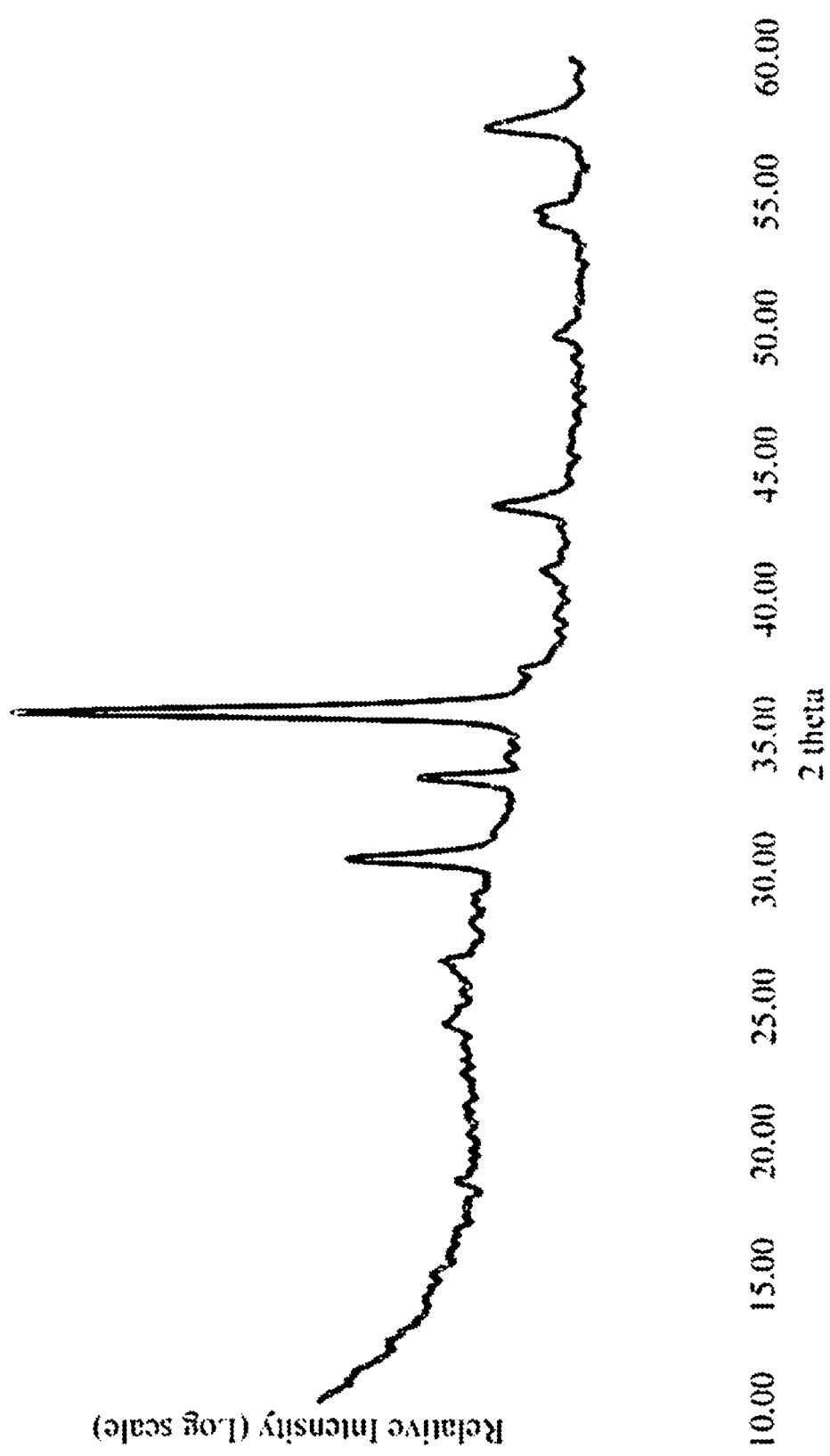
FIG. 4 shows the XRD pattern of the separated magnetic material.
Figure 5:
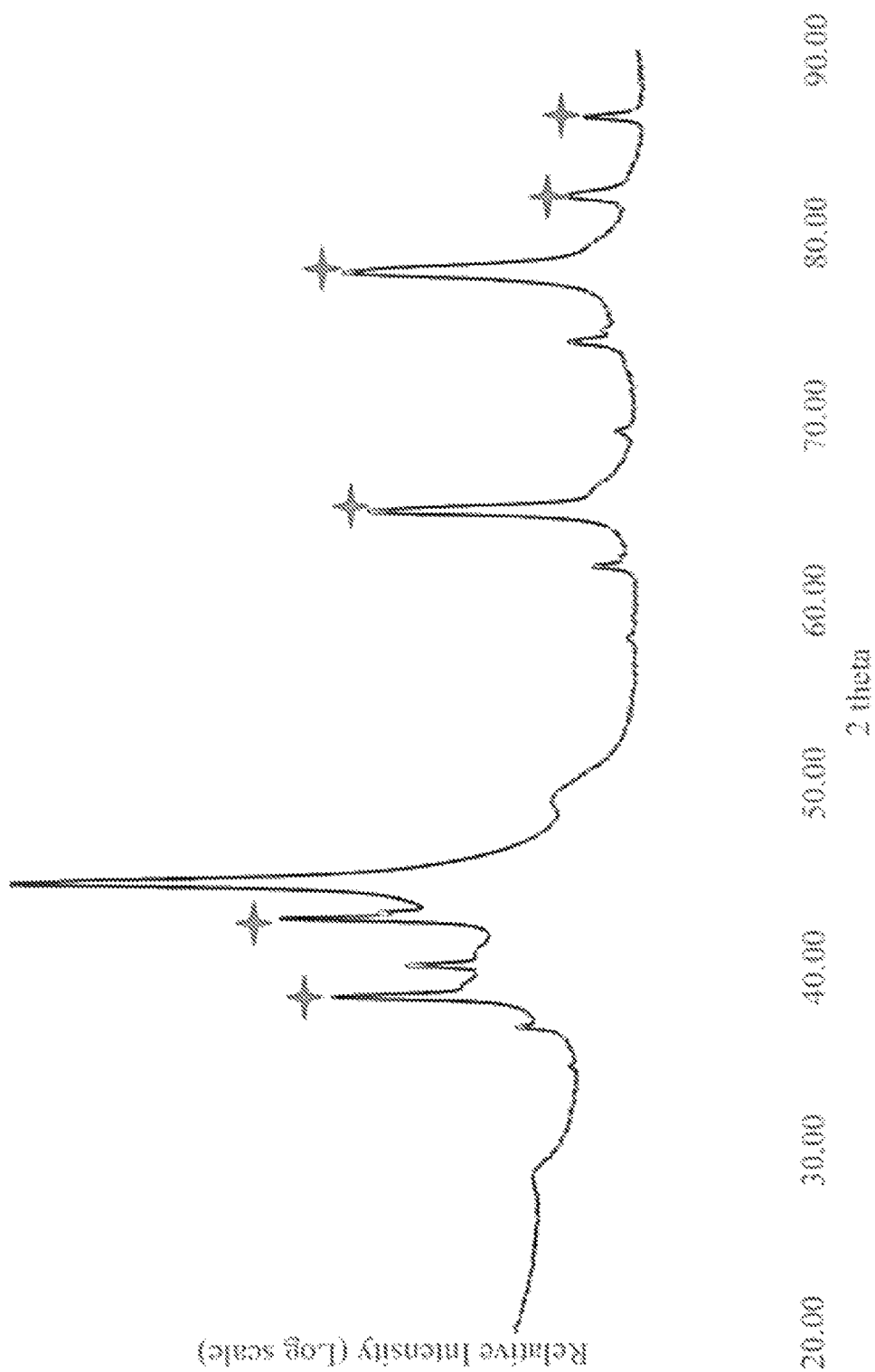
FIG. 5 shows the XRD pattern of metals deposited onto the gold electrode from the ionic liquid after purification of the coal ash.

FIG. 3 shows the x-ray diffraction results of the coal ash before and after purification with the ionic liquid/acid mixture. Table 1 shows the peak list for the initial fly ash—the composition was nearly a 50/50 blend of silicon oxide and iron oxides with some cerium oxide. Table 2 shows the peak list for the ash after purification—the composition is over 99% silicon oxide, with most of the iron oxides and cerium oxide removed. FIG. 4 shows the x-ray diffraction pattern of the separated magnetic material. Analysis of the separated magnetic components indicated mostly $Fe_2O_3$ and $Fe_3O_4$. Table 3 shows the peak identifications for the separated magnetic components. FIG. 5 shows the x-ray diffraction pattern of the material electroplated onto the gold electrode. In FIG. 5, the main peaks of gold are shown with stars, while the other peaks are identified as iron as well as several other lanthanides and actinides. Table 4 lists the peaks and the elements associated with them. The elements identified include thorium, samarium, europium, ytterbium, and iron.

The above data provide proof that this approach of using an ionic liquid/acid treatment can achieve the following:
  reducing the radioactivity of coal ash by over 90%;
  almost completely removing the iron from the coal ash (and thus providing iron for use in other applications); and
  significantly removing rare earth elements from the coal ash, which can then be removed from the ionic liquid via electrodeposition.

An alternative to the process would be to vary the type of ionic liquid. For instance, many rare earth ores are phosphate based rocks. If an ionic liquid using hexafluorophosphate is used, and the acid used is HF, then the results of the processing could also be used to remanufacture the ionic liquid as it is being used by fluorination of the resulting phosphate by-products.

Moreover, if the cost of using an ionic liquid is too high, this process could be adaptable to other solvent systems, such as ethylene glycol or poly-ethylene glycol.

TABLE 1

Reflections for the initial fly ash. Note that it is nearly a 50/50 blend of silicon oxide and iron oxides, with some cerium oxide.

| No. | 2-theta (deg) | d (ang.) | Height (cps) | Int. 1 (cps deg) | Phase name |
|---|---|---|---|---|---|
| 1 | 16.42 | 5.394 (11 | 129 (13) | 34 (4) | Maghemite-Q, syn(1, 1, 2), Cerium Oxide(0, 0, 2) |
| 2 | 20.77 | 4.273 (4) | 167 (15) | 39 (4) | Quartz alpha, alpha-Si O2(1, 0, 0), Maghemite-Q, |
| 3 | 25.39 | 3.505 (5) | 48 (8) | 47 (10) | Maghemite-Q, syn(2, 1, 2) |
| 4 | 26.515 | 3.3589 (7) | 922 (35) | 291 (8) | Quartz alpha, alpha-Si O2(0, 1, 1), Cerium Oxide(1, 1, 2) |
| 5 | 30.18 | 2.959 (4) | 87 (11) | 118 (11) | Maghemite-Q, syn(2, 1, 5) |
| 6 | 33.120 | 2.7027 (7 | 233 (18) | 67 (4) | Maghemite-Q, syn(3, 0, 2), Cerium Oxide(0, 0, 4) |
| 7 | 35.245 | 2.5443 (1 | 115 (12) | 169 (7) | Quartz alpha, alpha-Si O2(1, 1, 0), Maghemite-Q, |
| 8 | 35.554 | 2.5230 (1 | 255 (18) | 85 (7) | Maghemite-Q, syn(3, 1, 3) |
| 9 | 40.83 | 2.2081 (1 | 141 (14) | 35 (4) | Maghemite-Q, syn(3, 0, 7), Cerium Oxide(2, 1, 3) |
| 10 | 42.52 | 2.1245 (1 | 37 (7) | 12 (2) | Quartz alpha, alpha-Si O2(2, 0, 0), Maghemite-Q, syn(3, 1, 7) |
| 11 | 43.44 | 2.081 (4) | 36 (7) | 23 (11) | Maghemite-Q, syn(4, 0, 0) |

TABLE 1-continued

Reflections for the initial fly ash. Note that it is nearly a 50/50 blend of silicon oxide and iron oxides, with some cerium oxide.

| No. | 2-theta (deg) | d (ang.) | Height (cps) | Int. 1 (cps deg) | Phase name |
|---|---|---|---|---|---|
| 12 | 50.02 | 1.8221 (9 | 102 (12) | 55 (4) | Quartz alpha, alpha-Si O2(1, 1, 2), Maghemite-Q, |
| 13 | 53.89 | 1.700 (2) | 67 (9) | 95 (14) | Quartz alpha, alpha-Si O2(0, 2, 2), Maghemite-Q, |
| 14 | 57.22 | 1.6085 (1 | 74 (10) | 92 (16) | Quartz alpha, alpha-Si O2(2, 1, 0), Maghemite-Q, |
| 15 | 59.72 | 1.547 (3) | 47 (8) | 25 (11) | Quartz alpha, alpha-Si O2(1, 2, 1), Maghemite-Q, syn(4, 2, 9) |
| 16 | 60.54 | 1.5281 (7 | 90 (11) | 39 (8) | Maghemite-Q, syn(5, 1, 6), Cerium Oxide(4, 0, 4) |
| 17 | 63.00 | 1.4743 (1 | 75 (10) | 141 (14) | Quartz alpha, alpha-Si O2(1, 1, 3), Maghemite-Q, |
| 18 | 67.84 | 1.3803 (4 | 41 (7) | 27 (4) | Quartz alpha, alpha-Si O2(1, 2, 2), Maghemite-Q, |
| 19 | 90.13 | 1.0881 (1 | 24 (6) | 62 (12) | Quartz alpha, alpha-Si O2(1, 3, 2) |

TABLE 2

Reflections for fly ash after purification. Note that the sample is over 99% silicon oxide, with most of the iron oxides and cerium oxide removed.

| No. | 2-theta (deg) | d (ang.) | Height (cps) | Int. 1 (cps deg) | Phase name |
|---|---|---|---|---|---|
| 1 | 16.513 (14) | 5.364 (5) | 134 (13) | 31 (2) | Coesite(1, 1, −1) |
| 2 | 26.0 (2) | 3.42 (3) | 124 (13) | 812 (695) | Coesite(1, 1, 1), |
| 3 | 26.654 (2) | 3.3417 (3) | 1745 (48) | 435 (14) | Coesite(1, 1, −2) |
| 4 | 30.75 (12) | 2.905 (11) | 127 (13) | 1424 (963) | Coesite(0, 4, 0), Magnetite, |
| 5 | 33.22 (2) | 2.6949 (16) | 201 (16) | 67 (8) | Coesite(0, 4, 1) |
| 6 | 35.69 (2) | 2.5137 (13) | 213 (17) | 288 (10) | Magnetite, syn(3, 1, 1) |
| 7 | 40.86 (2) | 2.2069 (12) | 163 (15) | 41 (4) | Coesite(3, 1, −1) |
| 8 | 42.36 (3) | 2.1319 (12) | 42 (7) | 44 (5) | Coesite(2, 2, −3), Magnetite, |
| 9 | 50.02 (2) | 1.8219 (11) | 122 (13) | 54 (5) | Coesite(2, 4, −3) |
| 10 | 57.56 (2) | 1.5999 (5) | 55 (9) | 24 (3) | Coesite(4, 2, −1) |
| 11 | 60.74 (3) | 1.5235 (6) | 87 (11) | 32 (4) | Coesite(2, 4, 2) |
| 12 | 62.92 (8) | 1.4759 (16) | 50 (8) | 116 (15) | Coesite(0, 8, 1), Magnetite, |
| 13 | 68.06 (6) | 1.3765 (10) | 63 (9) | 40 (3) | Coesite(3, 1, −5) |
| 14 | 75.4 (2) | 1.260 (3) | 21 (5) | 26 (13) | Coesite(4, 2, −5), Magnetite, |

TABLE 3

Reflections of the separated magnetic material.

| No. | 2-theta (deg) | d (ang.) | Height (cps) | Int. 1 (cps deg) | Phase name |
|---|---|---|---|---|---|
| 1 | 30.25 (2) | 2.952 (2) | 284 (31) | 134 (8) | iron diiron(III) oxide, magnetite HP, syn(2, 2, 0) |
| 2 | 33.303 (6) | 2.6882 (5) | 226 (27) | 73 (3) | Hematite, syn(1, 0, 4) |
| 3 | 35.570 (10) | 2.5219 (7) | 1130 (61) | 573 (8) | iron diiron(III) oxide, magnetite HP, syn(3, 1, 1), Hematite, syn(1, 1, 0) |
| 4 | 43.23 (5) | 2.091 (2) | 155 (23) | 106 (7) | iron diiron(III) oxide, magnetite HP, syn(4, 0, 0), Hematite, syn(2, 0, 2) |
| 5 | 49.83 (17) | 1.828 (6) | 23 (9) | 33 (5) | Hematite, syn(0, 2, 4) |
| 6 | 54.06 (10) | 1.695 (3) | 53 (13) | 51 (12) | iron diiron(III) oxide, magnetite HP, syn(4, 2, 2), Hematite, syn(1, 1, 6) |
| 7 | 57.109 (10) | 1.6115 (3) | 185 (25) | 139 (6) | iron diiron(III) oxide, magnetite HP, syn(5, 1, 1), Hematite, syn(1, 2, 2) |
| 8 | 62.77 (4) | 1.4791 (9) | 244 (29) | 310 (14) | iron diiron(III) oxide, magnetite HP, syn(4, 4, 0), Hematite, syn(2, 1, 4) |
| 9 | 71.9 (14) | 1.31 (2) | 20 (8) | 156 (65) | iron diiron(III) oxide, magnetite HP, syn(5, 3, 1), Hematite, syn(1, 2, 5) |

TABLE 4

Reflections of elements removed from the coal ash and electroplated out from the ionic liquid/acid solution.

| No. | 2-theta (deg) | d (ang.) | Height (cps) | Int. 1 (cps deg) | Phase name |
|---|---|---|---|---|---|
| 1  | 28.69 (14)   | 3.109 (15)   | 22.3 (19)    | 29 (4)     | beta-Th(1, 1, 0) |
| 2  | 34.57 (15)   | 2.593 (11)   | 22.0 (19)    | 41 (14)    | Ytterbium(1, 0, 0) |
| 4  | 38.3813 (12) | 2.34337 (7)  | 3064 (23)    | 754 (7)    | Gold(1, 1, 1) |
| 7  | 42.6501 (12) | 2.11818 (6)  | 5239 (30)    | 960 (8)    | Samarium(1, 0, 1) |
| 8  | 42.9458 (18) | 2.10428 (8)  | 1238 (14)    | 223 (8)    | Samarium(0, 0, 2) |
| 10 | 44.6377 (2)  | 2.028372 (10)| 178453 (172) | 36270 (25) | Gold(2, 0, 0), alpha-Fe(1, 1, 0) |
| 14 | 64.814 (3)   | 1.43730 (6)  | 2029 (18)    | 641 (4)    | Gold(2, 2, 0), Europium(2, 2, 0), alpha-Fe(2, 0, 0) |
| 16 | 72.8 (6)     | 1.299 (9)    | 10.4 (13)    | 30 (6)     | Ytterbium(1, 0, 3), Samarium(1, 1, 2) |
| 19 | 77.793 (3)   | 1.22675 (4)  | 2561 (21)    | 1141 (6)   | Gold(3, 1, 1), europium(3, 1, 1), Samarium(2, 0, 0) |
| 20 | 81.91 (4)    | 1.1751 (4)   | 86 (4)       | 39 (2)     | Gold(2, 2, 2) |
| 21 | 82.3 (14)    | 1.171 (16)   | 2.4 (6)      | 5 (4)      | Europium(2, 2, 2), alpha-Fe(2, 1, 1) |
| 22 | 86.27 (2)    | 1.1267 (2)   | 71 (3)       | 21 (2)     | Ytterbium(2, 0, 2) |

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A method to recover heavy metals and rare earth elements from coal and fly ash, comprising:

mixing an ionic liquid with an organic acid;

adding coal ash, fly ash, or a combination thereof to the ionic liquid and organic acid mixture to form a slurry, wherein the coal ash, fly ash, or combination thereof comprises metals and rare earth elements;

stirring the slurry;

depositing the metals onto an electrode using electrodeposition; and filtering the slurry to remove any solid material.

2. The method of claim 1, wherein the ionic liquid comprises one of the following structures:

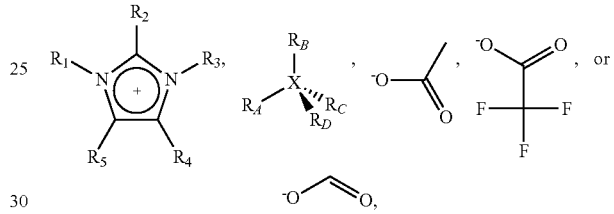

where R is an alkyl group or a hydrogen or a halide and X is N or P.

3. The method of claim 1, wherein the ionic liquid comprises 1-methyl-3-ethyl-midazolium trifluoroacetate.

4. The method of claim 1, wherein the ionic liquid comprises tetrafluoroborate, proprionate, or butanate.

5. The method of claim 1, wherein the organic acid comprises acetic acid.

6. The method of claim 1, wherein the electrode comprises copper.

7. The method of claim 1, additionally comprising recovering the ionic liquid.

8. The method of claim 1, additionally comprising electrochemically treating the electrode to remove the metals.

9. The method of claim 1, wherein the radioactivity of the coal ash, fly ash, or combination thereof is reduced by 90% or greater.

* * * * *